US012372907B2

(12) United States Patent
Shen et al.

(10) Patent No.: US 12,372,907 B2
(45) Date of Patent: Jul. 29, 2025

(54) FUSER DRIVING DEVICE FOR IMAGE FORMING DEVICE

(71) Applicant: KONICA MINOLTA, INC., Tokyo (JP)

(72) Inventors: Jian Shen, Wuxi (CN); Jing Fang, Wuxi (CN)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/462,011

(22) Filed: Sep. 6, 2023

(65) Prior Publication Data

US 2024/0085835 A1 Mar. 14, 2024

(30) Foreign Application Priority Data

Sep. 9, 2022 (CN) ........................ 202211102662.0

(51) Int. Cl.

*G03G 15/20* (2006.01)
*G03G 21/16* (2006.01)
*G03G 21/18* (2006.01)

(52) U.S. Cl.

CPC ..... *G03G 15/2092* (2013.01); *G03G 21/1647* (2013.01); *G03G 21/1685* (2013.01); *G03G 15/2035* (2013.01); *G03G 21/186* (2013.01); *G03G 21/1864* (2013.01); *G03G 2221/1639* (2013.01); *G03G 2221/1657* (2013.01)

(58) Field of Classification Search

CPC ........... G03G 15/2092; G03G 21/1647; G03G 21/1685; G03G 15/2064; G03G 15/2035; G03G 2215/2003; G03G 2221/1639; G03G 21/1857; G03G 21/186; G03G 21/1864; G03G 2221/1657

See application file for complete search history.

(56) References Cited

U.S. PATENT DOCUMENTS 9,857,759 B1 * 1/2018 Boyatt ............... G03G 21/1647
2002/0018666 A1 * 2/2002 Noda ................ G03G 21/1647 399/90
2005/0191092 A1 * 9/2005 Toso .................... G03G 15/757 399/167
2013/0302066 A1 * 11/2013 Kawai ................ G03G 21/1647 399/167
2017/0168446 A1 * 6/2017 Nieda .................. G03G 15/757
2018/0329339 A1 * 11/2018 Nieda ................ G03G 15/0865

(Continued)

*Primary Examiner* — Stephanie E Bloss
*Assistant Examiner* — Laura Roth
(74) *Attorney, Agent, or Firm* — CANTOR COLBURN LLP

(57) ABSTRACT

A fuser driving device is provided and includes a front frame and a rear frame. The front frame and the rear frame are fixedly connected to each other. Two ends of a gear are respectively mounted to the front frame and the rear frame. A driving arm is mounted in the gear and is movable axially along the gear to enter into or withdraw from the fuser. When the driving arm enters into the fuser, the driving arm is driven to rotate through the gear, to drive a fusing roller to rotate. A withdrawing device includes a pulling member and an operating member. One end of the pulling member is connected to the driving arm and the other end is connected to the operating member. The pulling member is moved by operating the operating member to pull the driving arm to withdraw from the fuser into the gear.

10 Claims, 9 Drawing Sheets

(56) References Cited

U.S. PATENT DOCUMENTS

| | | | | |
|---|---|---|---|---|
| 2018/0356764 | A1* | 12/2018 | Kamiya | G03G 21/1685 |
| 2018/0373196 | A1* | 12/2018 | Kamiya | G03G 15/2064 |
| 2019/0004474 | A1* | 1/2019 | Kamiya | G03G 21/1685 |
| 2021/0255582 | A1* | 8/2021 | Chen | G03G 21/1633 |

* cited by examiner

FUSER DRIVING DEVICE FOR IMAGE FORMING DEVICE

CROSS REFERENCE TO RELATED APPLICATIONS

The present invention claims priority under 35 U.S.C. § 119 to Chinese Application No. 202211102662.0 filed Sep. 9, 2022, the entire content of which is incorporated herein by reference.

TECHNICAL FIELD

The present application relates to the technical field of printer, and in particular to a fuser driving device, a fusing device and an image forming device.

BACKGROUND

In a fuser driving device, a driving arm is located inside a gear, one end of the driving arm is supported on the gear through a spring, and the other end is limited by a limiting part. Two ends of the gear are respectively fixed on a front bone and a rear bone through a bearing and a shaft, and the shaft is integrated with the rear bone. The gear is also placed in a linkage part and can slide axially along the shaft on the back bone with the linkage part. The device further has a handle mounted on the rear bone through a rotating shaft. One end of the handle is an operating part, and the other end is connected to the linkage part. The rotating shaft of the handle is provided with a torsion spring, so that the handle can be kept in a position when it is not applied with a force. When a force is applied to one end of the handle, the handle can rotate around the rotating shaft, and at the same time, the other end drives the linkage part to move. Then the linkage part drives the gear to move, the gear drives the limiting part to move, and the limiting part drives the driving arm to move, thus realizing the linkage between the handle and the driving arm.

Under normal conditions, the driving arm is inserted in a joining part of the fuser to drive the driving roller to rotate. When the fuser needs to be disassembled, it is necessary to withdraw the driving arm from the joining part of the fuser to separate the driving arm from the fuser, or otherwise the fuser cannot be disassembled. In the conventional art, the back-off of the driving arm is realized by the withdrawing of the gear in a limited space, and the withdrawing distance of the gear is equal to the back-off distance of the driving arm. When the power of the fuser increases, the required rotating torque will increase, and the size of the driving arm and gear will increase accordingly. The withdrawing distance of the enlarged gear in the limited space becomes smaller, and the back-off distance of the driving arm becomes smaller, which is not enough for the driving arm to be withdrawn from the joining part of the fuser and separated from the fuser, so that the fuser cannot be disassembled.

SUMMARY

In order to solve the technical problems existing in the conventional art, the present application provides a fuser driving device, a fusing device and an image forming device. The fuser driving device can drive a driving arm to back off in an enlarged gear, thus avoiding the problems that the driving arm cannot be completely detached from the fuser and cannot be separated from the fuser due to the increased size of the gear and insufficient withdrawing distance.

According to one aspect of the present application, a fuser driving device is provided. The fuser driving device includes: a front frame and a rear frame, wherein the front frame and the rear frame are fixedly connected to each other; a gear, where two ends of the gear are respectively mounted to the front frame and the rear frame through a bearing; a driving arm mounted in the gear, wherein the driving arm is movable axially along the gear to enter into or withdraw from a fuser, and when the driving arm enters into the fuser, the driving arm is driven to rotate through the gear, to drive a fusing roller of the fuser to rotate; and a withdrawing device including a pulling member and an operating member, wherein one end of the pulling member is connected to the driving arm and the other end of the pulling member is connected to the operating member, and the pulling member is moved by operating the operating member, to pull the driving arm to withdraw the fuser into the gear.

Optionally, a spring is arranged between the driving arm and the gear, and the spring is compressed when the pulling member pulls the driving arm to withdraw into the gear.

Optionally, the pulling member includes a first spherical component, a second spherical component and a flexible connector, wherein the first spherical component is connected to the driving arm and the second spherical component is connected to the operating member, and the flexible connector passes through the spring and connects the first spherical component and the second spherical component.

Optionally, the operating member includes a connecting part and a handle part, one end of the connecting part is connected to the pulling member, and the other end of the connecting part is connected to the handle part.

Optionally, the operating member is connected to the rear frame through a pivot shaft, and the connecting part is driven to move the pulling member by rotating the handle part along the pivot shaft, to pull the driving arm to withdraw into the gear.

Optionally, the operating member further includes a fixing part for fixing the handle part when the driving arm is withdrawn into the gear.

Optionally, the operating member is connected to the rear frame through a sliding shaft, and the connecting part is driven to move the pulling member by moving the handle part along the sliding shaft, to pull the driving arm to withdraw into the gear.

Optionally, the sliding shaft includes a first sliding shaft and a second sliding shaft, where a length of the first sliding shaft is greater than a length of the second sliding shaft. When the handle part moves out of the second sliding shaft, one end of the second sliding shaft is configured to abut against the connecting part to prevent the handle from withdrawing.

Optionally, the fuser driving device includes a door having a touch lever. When the door is closed, the touch lever releases the withdrawing device, so that the driving arm enters into the fuser under the restoring force of the spring. Alternatively, the fuser driving device includes a door, and when the driving arm is withdrawn from the fuser into the gear, the door interferes with the withdrawal device, to stop the door from being closed.

Optionally, the fuser driving device further includes a transparent cover plate. When the driving arm enters into the fuser, the transparent cover plate covers a fixing device for fixing the fuser. When the driving arm is withdrawn from the fuser, the transparent cover plate exposes the fixing device for fixing the fuser.

A fusing device is provided according to another aspect of the present application. The fusing device includes a fuser including a fusing roller and a pressure roller arranged opposite to the fusing roller, and a fuser driving device for driving the fusing roller of the fuser to rotate.

An image forming device is provided according to another aspect of the present application. The image forming device includes an image forming mechanism for forming an image on paper, and a fusing device for fixing the image formed by the image forming mechanism on the paper.

Compared with the conventional technology, the technical solutions according to the embodiments of the present application have the following advantageous effects.

According to an embodiment of the present application, the fuser driving device includes a withdrawing device, which includes a pulling member and an operating member, where one end of the pulling member is connected to the driving arm and the other end is connected to the operating member, and the pulling member is moved by operating the operating member, so that the driving arm is pulled to withdraw from the fuser into the gear. The fuser driving device can drive the driving arm to back off in the enlarged gear, thus avoiding the problems that the driving arm cannot be completely detached from the fuser and cannot be separated from the fuser due to the increased size of the gear and insufficient withdrawing distance.

Further, a spring is arranged between the driving arm and the gear, and the spring is compressed when the pulling member pulls the driving arm to withdraw into the gear. When the withdrawing device is released, the driving arm can automatically enters into the fusing roller of the fuser under the restoring force of the spring.

Further, the pulling member includes a first spherical component, a second spherical part and a flexible connector, where the first spherical member is connected to the driving arm, the second spherical member is connected to the operating member, and the flexible connector passes through the spring and connects the first spherical component and the second spherical component. On one hand, it is convenient to pull the driving arm through the flexible connector, and on the other hand, the flexible connector allows free shaking of the driving arm, which is convenient for the driving arm to enter into the fuser, thus avoiding damage to the fuser.

BRIEF DESCRIPTION OF THE DRAWINGS

Other features and advantages of the present application will be better understood from the following optional embodiments described in detail in conjunction with the accompanying drawings, in which same reference numerals indicate same or similar parts. In the drawings.

DETAILED DESCRIPTION OF THE EMBODIMENTS

Figure 1:
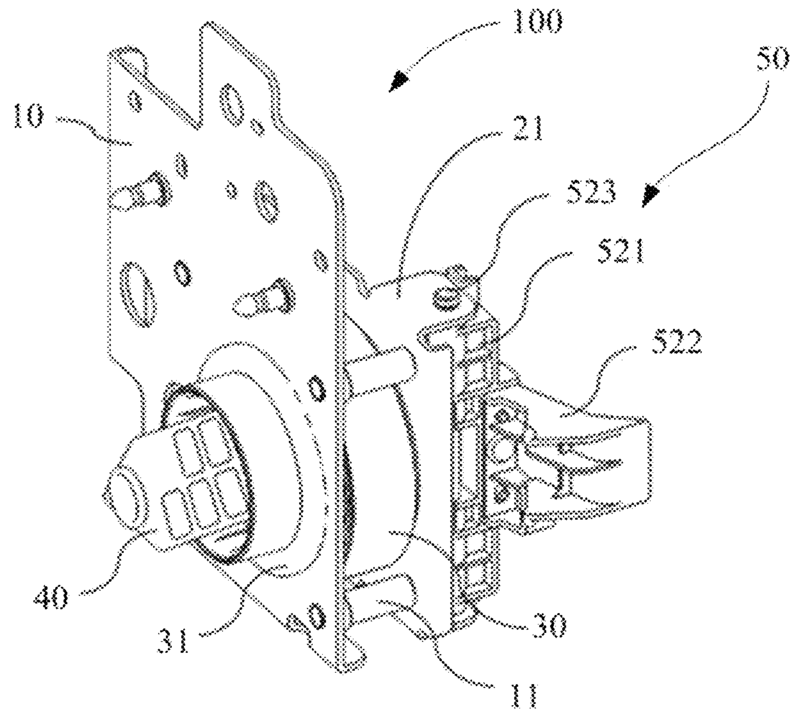
FIG. 1 shows a schematic structural view of a fuser driving device according to a first embodiment of the present application.

The implementation and use of the embodiments are discussed in detail below. However, it should be understood that the specific embodiments discussed are only exemplary descriptions of specific ways to implement and use the present application, and are not intended to limit the scope of the present application. In descriptions, the structural positions, such as above, below, top and bottom, of each part is not absolute positions, but relative positions. When various parts are arranged as shown in the drawings, these directional expressions are appropriate, and when the positions of the parts in the drawings change, these directional expressions also change accordingly.

As mentioned in the background, in the conventional art, the back-off of the driving arm is realized by the withdrawing of the gear in a limited space, and the withdrawing distance of the gear is equal to the back-off distance of the driving arm. When the power of the fuser increases, the required rotating torque will increase, and the size of the driving arm and gear will increase accordingly. The withdrawing distance of the enlarged gear in the limited space becomes smaller, and the back-off distance of the driving arm becomes smaller, which is not enough for the driving arm to be withdrawn from the joining part of the fuser and separated from the fuser, so that the fuser cannot be disassembled.

In order to solve the technical problem, a fuser driving device is provided according to the present application, including: a front frame and a rear frame, where the front frame and the rear frame are fixedly connected to each other; a gear, where two ends of the gear are respectively mounted to the front frame and the rear frame through a bearing; a driving arm mounted in the gear, wherein the driving arm is movable axially along the gear to enter into or withdraw from a fuser, and when the driving arm enters into the fuser, the driving arm is driven to rotate through the gear, to drive a fusing roller of the fuser to rotate; and a withdrawing device including a pulling member and an operating member, wherein one end of the pulling member is connected to the driving arm and the other end of the pulling member is connected to the operating member, and the pulling member can be moved by operating the operating member, to pull the driving arm to withdraw from the fuser into the gear.

Therefore, the fuser driving device can drive the driving arm to back off in the enlarged gear, so as to solve the problem that the driving arm cannot be completely detached from the fuser and cannot be separated from the fuser due to the increased size of the gear and insufficient withdrawing distance.

Figure 2:
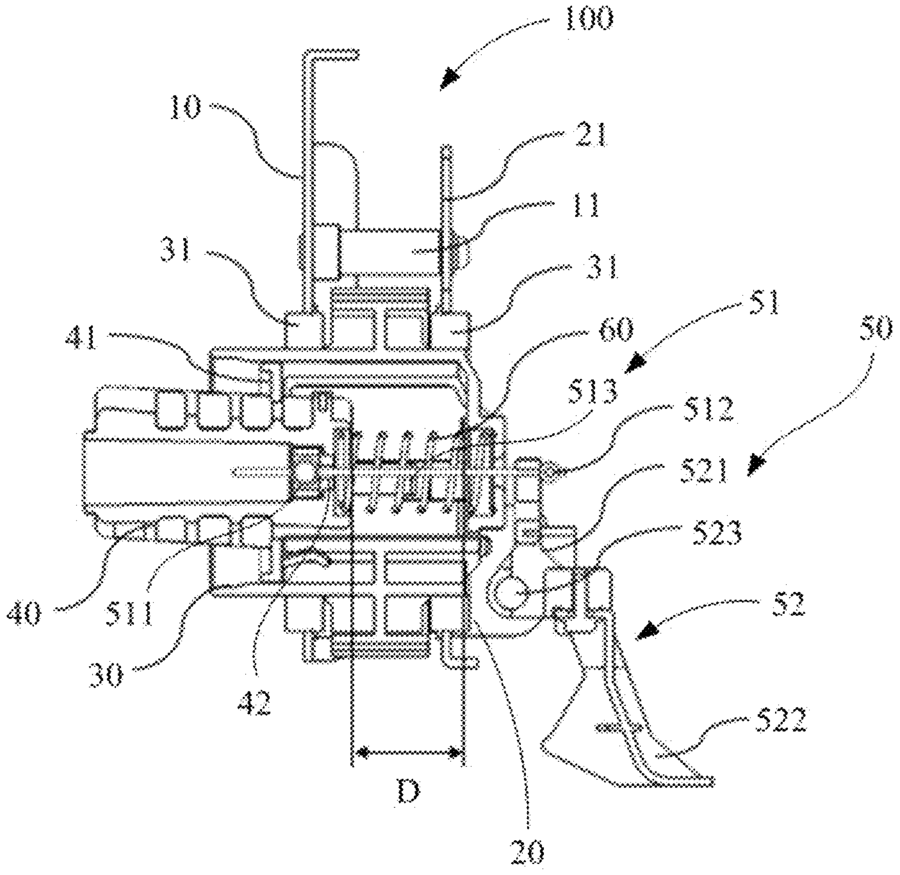
FIG. 2 shows a schematic cross-sectional view of the fuser driving device in FIG. 1.

FIG. 1 shows a schematic structural view of a fuser driving device 100 according to a first embodiment of the present application, and FIG. 2 shows a schematic cross-sectional view of the fuser driving device 100 in FIG. 1.

Specifically, the fuser driving device 100 includes a front frame 10, a rear frame 20, a gear 30, a driving arm 40, and a withdrawing device 50. The front frame 10 and the rear frame 20 are fixedly connected to each other, for example, by a plurality of fixed shafts 11. Two ends of the gear 30 are respectively mounted to the front frame 10 and the rear frame 20 through a bearing 31, and the gear 30 can rotate around the gear shaft, but is axially fixed relative to the front frame 10. The driving arm 40 can be mounted in the gear 30 through a limiting member 41, and the driving arm 40 can move axially along the gear 30, to enter into or withdraw from the fuser (not shown). When the driving arm 40 enters into the fuser, the driving arm 40 is driven to rotate through the gear 30, and then the driving arm 40 drives a fusing roller of the fuser to rotate. The withdrawing device 50 includes a pulling member 51 and an operating member 52. One end of the pulling member 51 is connected to the driving arm 40, and the other end of the pulling member is connected to the operating member 52. The pulling member 51 is moved by operating the operating member 52, and to pull the driving arm 40 to withdraw from the fuser into the gear 30, so that the driving arm 40 is separated from the fuser, which facilitates the removal of the fuser.

In some embodiments, the rear frame 20 is provided with a gear fixing plate 21 for mounting the gear 30. The front frame 10 and the gear fixing plate 21 are connected to each other by a plurality of fixing shafts 11. The gear 30 is fixed with reference to the front frame 10, thus ensuring the relative position accuracy of the gear 30.

In some embodiments, a spring 60 is provided between the driving arm 40 and the gear 30, and the spring 60 is compressed when the pulling member 51 pulls the driving arm 40 to withdraw into the gear 30. When the withdrawing device 50 is released, one end of the driving arm 40 can automatically enter into the fusing roller of the fuser under the restoring force of the spring 60. The other end of the driving arm 40 is mounted in the gear 30 through the limiting member 41, so that the driving arm 40 can rotate with the rotation of the gear 30.

In some embodiments, the pulling member 51 includes a first spherical component 511 connected to the driving arm 40, a second spherical component 512 connected to the operating member 52, and a flexible connector 513 passing through the spring 60 to connect the first spherical component 511 and the second spherical component 512.

Specifically, the driving arm 40 has an inner hole 42. The diameter of the first spherical component 511 is larger than that of the inner hole 42, and the diameter of the second spherical component 512 is smaller than that of the inner hole 42. The first spherical component 511 is limited in the inner hole 42 of the driving arm 40, the flexible connector 513 passes through the spring 60, and the second spherical component 512 is limited on the operating member 52.

In some embodiments, the flexible connector 513 may be made of wire rope or other flexible materials. On one hand, it is convenient to pull the driving arm 40 through the flexible connector 513, and on the other hand, the flexible connector 513 allows the free shaking of the driving arm 40. The driving arm 40 is a substantially triangular part, and a joining part for connecting the driving arm 40 to the fusing roller of the fuser is provided with a substantially triangular hole for receiving the driving arm 40. The free shaking of the driving arm 40 facilitates the inserting of the driving arm 40 into the fusing roller of the fuser, thus avoiding damage to the fuser.

In some embodiments, the operating member 52 includes a connecting part 521 and a handle part 522, where one end of the connecting part 521 is connected to the pulling member 51, and the other end is connected to the handle part 522.

In some embodiments, the operating member 52 is connected to the rear frame 20 through a pivot shaft 523. The connecting part 521 is driven to move by rotating the handle part 522 along the pivot shaft 523, then the connecting part 521 drives the pulling member 51 to move, and the pulling member 51 pulls the driving arm 40 to withdraw into the gear 30. "D" in FIG. 2 indicates the distance that the driving arm 40 can be withdrawn.

According to the embodiments of the present application, the gear 30 is fixed and cannot move between the front frame 10 and the rear frame 20, while the driving arm 40 is moved directly by the withdrawing device 50, to be withdrawn from the joining part of the fuser. Therefore, this method effectively utilizes the disadvantages of the existing structure, and avoids the problems that the driving arm cannot be completely detached from the joining part of the fuser and thus cannot be separated from the fuser due to the increased size of the gear and insufficient withdrawing distance.

Figure 3:
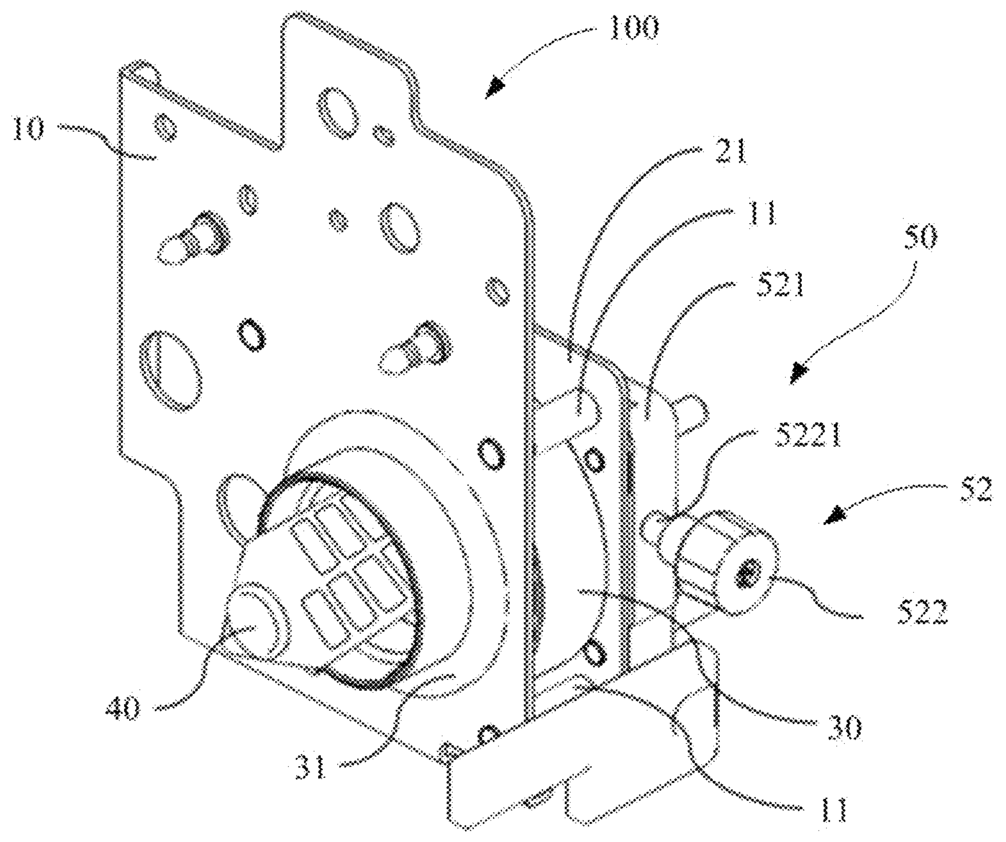
FIG. 3 shows a schematic structural view of a fuser driving device according to a second embodiment of the present application.
Figure 4:
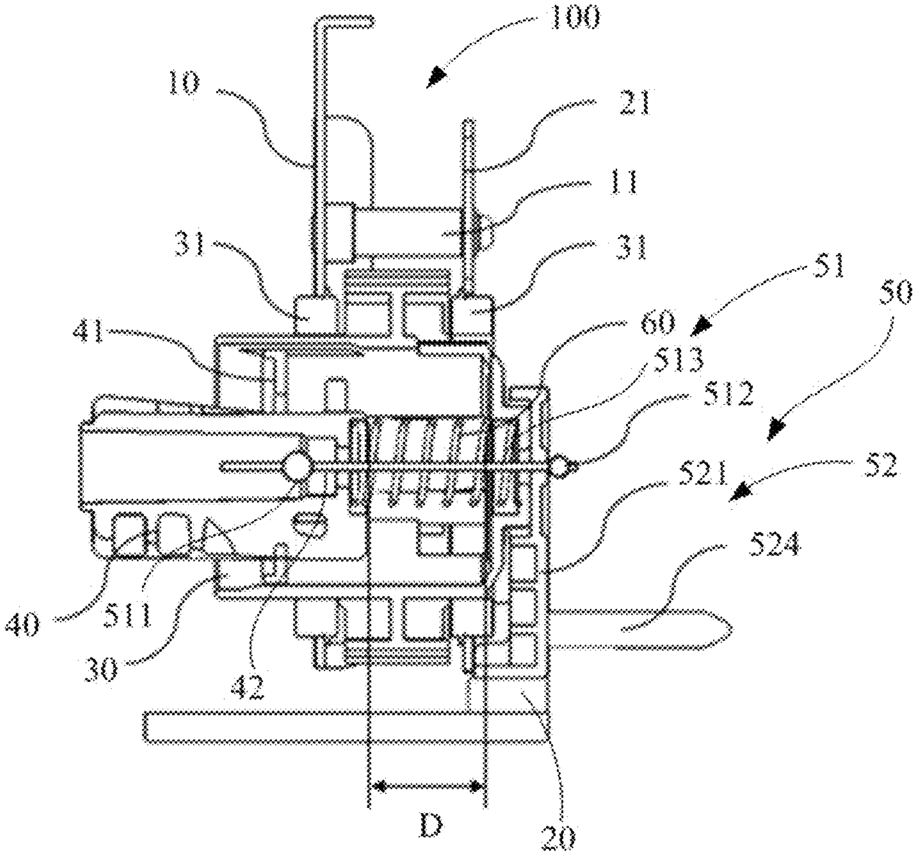
FIG. 4 shows a schematic cross-sectional view of the fuser driving device in FIG. 3.

FIG. 3 shows a schematic structural view of a fuser driving device 100 according to a second embodiment of the present application, and FIG. 4 shows a schematic cross-sectional view of the fuser driving device 100 in FIG. 3.

In this embodiment, the operating member 52 includes a connecting part 521 and a handle part 522. One end of the connecting part 521 is connected to the pulling member 51, and the other end is connected to the handle part 522. For example, the handle part 522 is mounted to the connecting part 521 through a handle shaft 5221.

Different from the first embodiment shown in FIG. 1, the operating member 52 is connected to the rear frame 20 through a sliding shaft 524. The connecting part 521 is driven to move by moving the handle part 522 along the sliding shaft 524, and then the connecting part 521 drives the pulling member 51 to move, and the pulling member 51 pulls the driving arm 40 to withdraw into the gear 30. "D" in FIG. 4 indicates the distance that the driving arm 40 can be withdrawn.

This method effectively utilizes the disadvantages of the existing structure, and avoids the problems that the driving arm cannot be completely detached from the joining part of the fuser and thus cannot be separated from the fuser due to the increase size of the gear and insufficient withdrawing distance.

Figure 5:
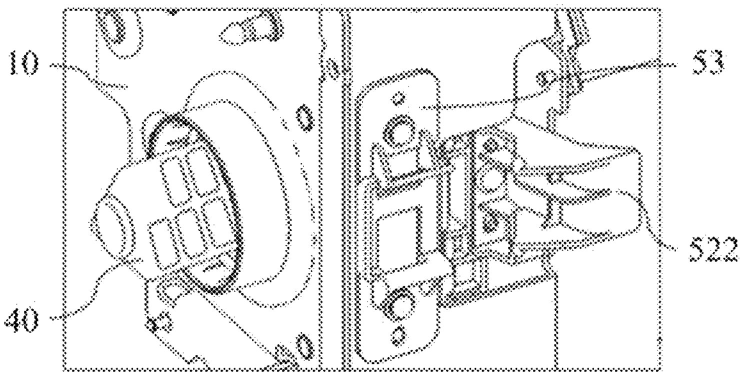
FIG. 5 and FIG. 6 show schematic structural views of a fuser driving device according to a third embodiment of the present application.
Figure 6:
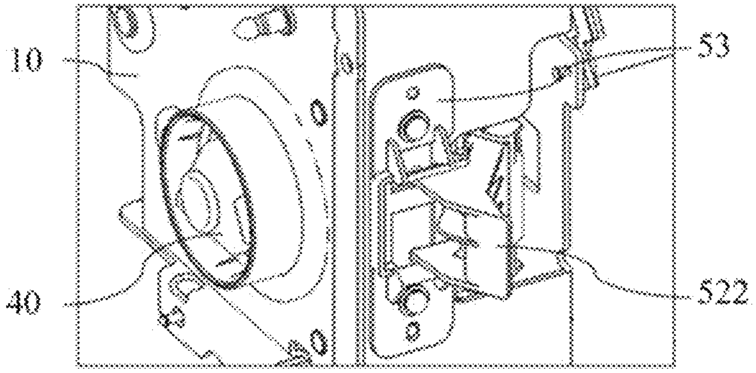

FIG. 5 and FIG. 6 show schematic structural views of a fuser driving device according to a third embodiment of the present application.

In this embodiment, the operating member 52 further includes a fixing part 53 for fixing a handle part 522 when the driving arm 40 is withdrawn into a gear 30. Other structures of the operating member 52 may be as same as those of the first embodiment shown in FIG. 1, and will not be described in detail here. When the handle part 522 is moved from a first position as shown in FIG. 5 to a second position as shown in FIG. 6, the driving arm 40 is withdrawn from the fuser into the gear 30, thus realizing the back-off of the driving arm 40, and the handle part 522 is fixed at the second position by the fixing part 53. For example, the handle part 522 is provided with a protrusion and the fixing part 53 is provided with a groove. When the handle part 522 is moved to the second position, the protrusion on the handle part 522 enters into the groove on the fixing part 53, thereby realizing the fixing of the handle part 522.

In this embodiment, the fixing part 53 is provided to fix the handle part 522, so that the driving arm 40 will not be reset under the action of a spring 60, but is maintained in the back-off state, thereby facilitating the disassembly of the fuser.

Figure 7:
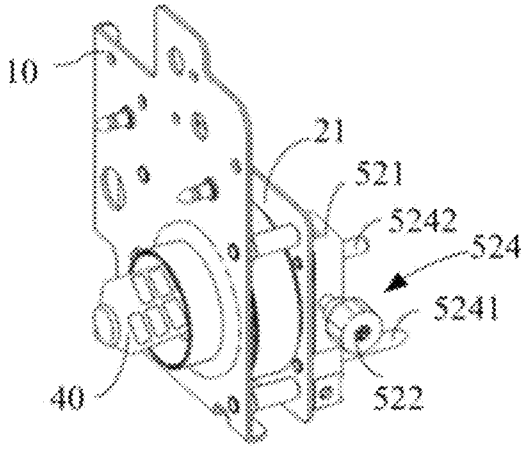
FIG. 7, FIG. 8, and FIG. 9 show schematic structural views of a fuser driving device according to a fourth embodiment of the present application.
Figure 8:
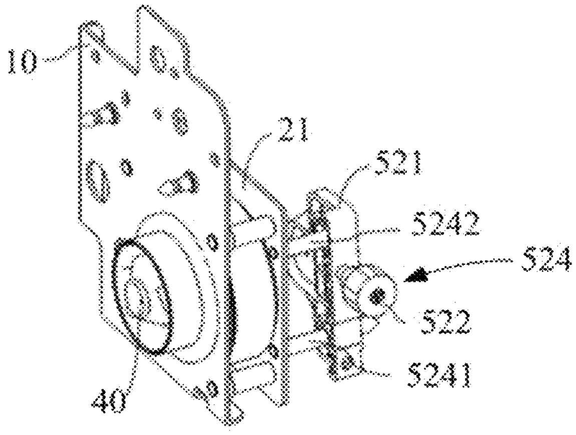
Figure 9:
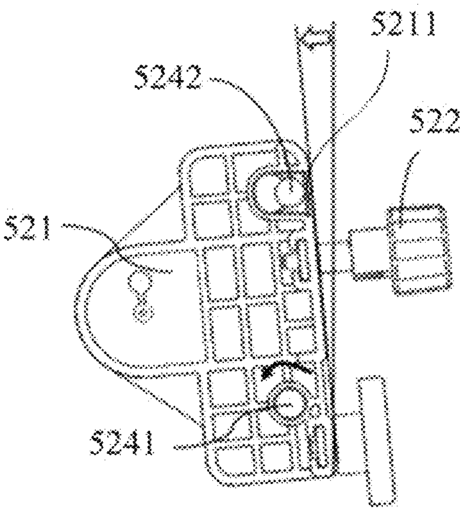

FIG. 7, FIG. 8 and FIG. 9 show schematic structural views of a fuser driving device according to a fourth embodiment of the present application.

In this embodiment, the operating member 52 is connected to the rear frame 20 through a sliding shaft 524, and the connecting part 521 is driven to move by moving a handle part 522 of the operating member 52 along the sliding shaft 524. The sliding shaft 524 includes a first sliding shaft 5241 and a second sliding shaft 5242, where a length of the first sliding shaft 5241 is greater than a length of the second sliding shaft 5242. When the handle part 522 moves out of the second sliding shaft 5242, one end of the second sliding shaft 5242 can abut against the connecting part 521 to prevent the handle part 522 from withdrawing.

For example, when the handle part 522 is pulled to withdraw the driving arm 40 to a designated position, the handle part 522 moves out of the second sliding shaft 5242. By rotating the connecting part 521 around the first sliding shaft 5241, the end of the second sliding shaft 5242 is pushed into the groove 5211 of the connecting part 521, thereby fixing the connecting part 521. With this arrangement, the driving arm 40 will not be reset under the action of the spring 60, but is maintained in the back-off state, thus facilitating the disassembly of the fuser.

Figure 10:
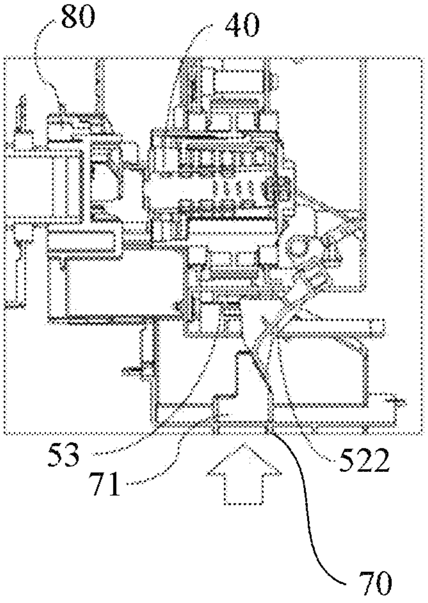
FIG. 10 and FIG. 11 show schematic structural views of a fuser driving device according to a fifth embodiment of the present application.
Figure 11:
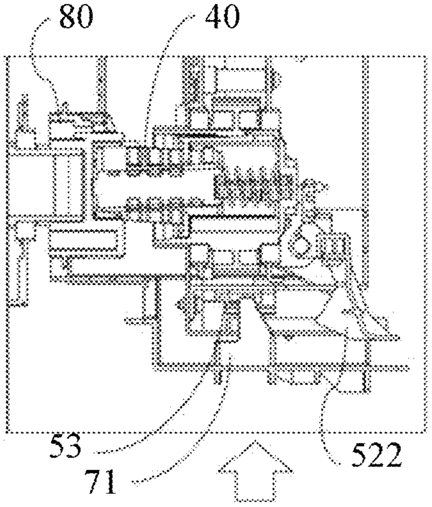

FIG. 10 and FIG. 11 show schematic structural views of a fuser driving device 100 according to a fifth embodiment of the present application.

In this embodiment, the fuser driving device 100 includes a door 70 having a touch lever 71. When the door 70 is closed in the arrow direction shown in the figure, the touch lever 71 can release the withdrawing device 50, for example, by releasing the handle part 522, so that the driving arm 40 enters into the fuser 80 under the restoring force of the spring 60. The specific structure of the handle part 522 may be as same as that of the first embodiment shown in FIG. 1, and will not be described in detail here.

When the handle part 522 is in a position shown in FIG. 10, the driving arm 40 is in a back-off state and separated from the fuser 80. At this time, the door 70 is closed, and the touch lever 71 of the door 70 can push the handle part 522, so that the handle part 522 is separated from the fixing part 53, and then enters into a position shown in FIG. 11 under the restoring force of the spring 60. Since the handle part 522 is separated from the fixing part 53, the driving arm 40 is released from the back-off state, and enters into the fuser 80 under the restoring force of the spring 60 so as to be connected to the fuser 80.

This arrangement can avoid the damage to the fuser 80 caused by the machine being powered on in a wrong state when forgetting to release the driving arm 40 from the back-off state.

Figure 12:
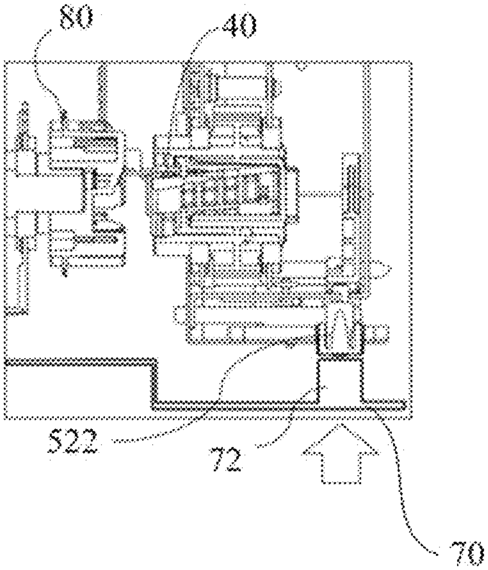
FIG. 12 and FIG. 13 show schematic structural views of a fuser driving device according to a sixth embodiment of the present application.
Figure 13:
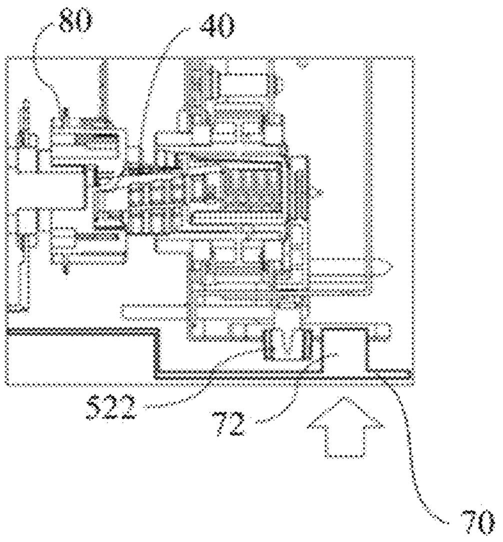

FIG. 12 and FIG. 13 show schematic structural views of a fuser driving device 100 according to a sixth embodiment of the present application.

In this embodiment, the fuser driving device 100 includes a door 70 having a protruding portion 72. When the driving arm 40 is withdrawn from the fuser 80 into the gear 30, the protruding portion 72 of the door 70 interferes with the withdrawing device 50, so that the door 70 cannot be closed.

When in a position shown in FIG. 12, the driving arm 40 is withdrawn into the gear 30 and is completely separated from the joining part of the fuser 80. At this time, the protruding portion 72 of the door 70 interferes with the handle part 522, so that the door 70 cannot be closed normally. When in a position shown in FIG. 13, the driving arm 40 is released from the back-off state and connected to the joining part of the fuser 80. At this time, the protruding portion 72 and the handle part 522 of the door 70 are staggered from each other, and thus the door 70 can be closed normally.

With this arrangement, when the driving arm is not released from the back-off state, the door 70 cannot be closed, so that the machine cannot be operated and the fuser 80 cannot be started, thus preventing the machine from being damaged due to operating in a wrong state.

Figure 14:
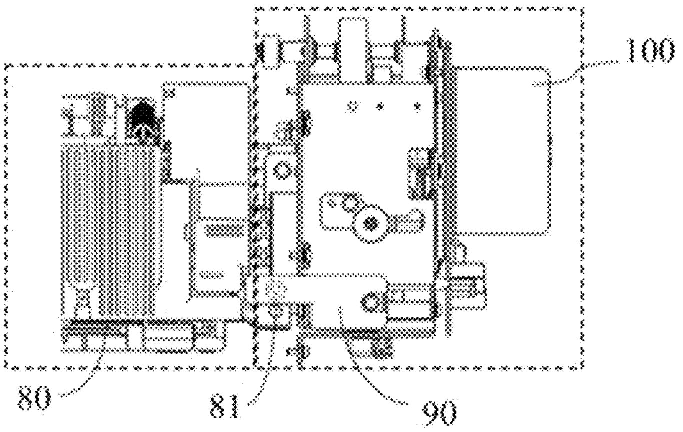
FIG. 14 shows a structural schematic view of a fuser driving device according to a seventh embodiment of the present application.

FIG. 14 shows a structural schematic view of a fuser driving device 100 according to a seventh embodiment of the present application.

In this embodiment, the fuser driving device 100 further includes a movable transparent cover plate 90. The transparent cover plate 90 may be provided on, for example, the connecting part 521 of the operating member 52 to move along with the movement of the operating member 52. When the driving arm 40 enters into the fuser 80, the transparent cover plate 90 covers a fixing device, such as a fixing screw 81, used for fixing the fuser 80. When the driving arm 40 is withdrawn from the fuser 80, the transparent cover plate 90 exposes the fixing screw 81.

In a normal state (when a printer works normally), the transparent cover 90 covers the fixing screw 81, so that the operator cannot touch the fixing screw 81. When it is required to remove the fuser 80 from the main body, the handle part 522 is pulled to withdraw the driving arm 40 to the designated position, so that the transparent cover plate 90 is removed, to completely expose the fixing screw 81. At this time, the operator can remove the fuser 80.

This arrangement can prevent the fuser 80 from being directly disassembled without withdrawing the driving arm 40 from the joining part of the fuser 80, which results in damage to the driving arm 40. At the same time, whether the fixing screw 81 is in place can be checked through the transparent cover plate 90.

A fusing device is provided according to another aspect of the present application. The fusing device includes a fuser including a fusing roller and a pressure roller opposite to the fusing roller, and a fuser driving device for driving the fusing roller of the fuser to rotate.

An image forming device is provided according to another aspect of the present application. The image forming device includes an image forming mechanism for forming an image on paper, and a fusing device for fixing the image formed by the image forming mechanism on paper.

According to an embodiment of the present application, the fuser driving device includes a withdrawing device, which includes a pulling member and an operating member, where one end of the pulling member is connected to the driving arm and the other end is connected to the operating member. The pulling member is moved by operating the operating member so as to pull the driving arm to withdraw from the fuser into the gear. The fuser driving device can drive the driving arm to back off in the enlarged gear, thus avoiding the problems that the driving arm cannot be completely detached from the fuser and cannot be separated from the fuser due to the increased size of the gear and insufficient withdrawing distance.

The technical contents and features of the present application have been disclosed above, however, it can be understood that under the creative idea of the present application, those skilled in the art can make various changes and improvements to the above-mentioned disclosed ideas, and these all fall within the protection scope of the present application. The description of the above embodiments is illustrative rather than limiting, and the protection scope of the present application is defined by the claims.

The invention claimed is:

1. A fuser driving device, comprising:

a front frame and a rear frame, wherein the front frame and the rear frame are fixedly connected to each other;

a gear, wherein two ends of the gear are respectively mounted to the front frame and the rear frame through a bearing;

a driving arm mounted in the gear, wherein the driving arm is movable axially along the gear to enter into or withdraw from a fuser, and when the driving arm enters into the fuser, the driving arm is driven to rotate through the gear, to drive a fusing roller of the fuser to rotate; and a withdrawing device comprising a pulling member and an operating member, wherein one end of the pulling member is connected to the driving arm and the other end of the pulling member is connected to the operating member, and the pulling member is moved by operating the operating member, to pull the driving arm to withdraw from the fuser into the gear;

wherein a spring is arranged between the driving arm and the gear, and the spring is compressed when the pulling member pulls the driving arm to withdraw into the gear;

wherein the pulling member comprises a first spherical component, a second spherical component and a flexible connector, and wherein the first spherical component is connected to the driving arm and the second spherical component is connected to the operating member, and the flexible connector passes through the spring and connects the first spherical component and the second spherical component;

wherein the operating member comprises a connecting part and a handle part, one end of the connecting part is connected to the pulling member, and the other end of the connecting part is connected to the handle part; and wherein the operating member is connected to the rear frame through a sliding shaft, and the connecting part is driven to move the pulling member by moving the handle part along the sliding shaft, to pull the driving arm to withdraw into the gear.

2. The fuser driving device according to claim 1, wherein the operating member is connected to the rear frame through a pivot shaft, and the connecting part is driven to move the pulling member by rotating the handle part along the pivot shaft, to pull the driving arm to withdraw into the gear.

3. The fuser driving device according to claim 2, wherein the operating member further comprises a fixing part for fixing the handle part when the driving arm is withdrawn into the gear.

4. The fuser driving device according to claim 1, wherein the sliding shaft comprises a first sliding shaft and a second sliding shaft, wherein a length of the first sliding shaft is greater than a length of the second sliding shaft, and when the handle part moves out of the second sliding shaft, one end of the second sliding shaft is configured to abut against the connecting part to prevent the handle from withdrawing.

5. The fuser driving device according to claim 1, wherein the fuser driving device comprises a door having a touch lever, and when the door is closed, the touch lever releases the withdrawing device, so that the driving arm enters into the fuser under the restoring force of the spring; or the fuser driving device comprises a door, and when the driving arm is withdrawn from the fuser into the gear, the door interferes with the withdrawal device, to stop the door from being closed.

6. A fuser driving device, comprising:

a front frame and a rear frame, wherein the front frame and the rear frame are fixedly connected to each other;

a gear, wherein two ends of the gear are respectively mounted to the front frame and the rear frame through a bearing;

a driving arm mounted in the gear, wherein the driving arm is movable axially along the gear to enter into or withdraw from a fuser, and when the driving arm enters into the fuser, the driving arm is driven to rotate through the gear, to drive a fusing roller of the fuser to rotate; and a withdrawing device comprising a pulling member and an operating member, wherein one end of the pulling member is connected to the driving arm and the other end of the pulling member is connected to the operating member, and the pulling member is moved by operating the operating member, to pull the driving arm to withdraw from the fuser into the gear;

wherein the fuser driving device further comprises a transparent cover plate, when the driving arm enters into the fuser, the transparent cover plate covers a fixing device for fixing the fuser, and when the driving arm is withdrawn from the fuser, the transparent cover plate exposes the fixing device for fixing the fuser.

7. The fuser driving device according to claim 6, wherein a spring is arranged between the driving arm and the gear, and the spring is compressed when the pulling member pulls the driving arm to withdraw into the gear.

8. The fuser driving device according to claim 7, wherein the pulling member comprises a first spherical component, a second spherical component and a flexible connector, and wherein the first spherical component is connected to the driving arm and the second spherical component is connected to the operating member, and the flexible connector passes through the spring and connects the first spherical component and the second spherical component.

9. The fuser driving device according to claim 8, wherein the operating member comprises a connecting part and a handle part, one end of the connecting part is connected to the pulling member, and the other end of the connecting part is connected to the handle part.

10. The fuser driving device according to claim 9, wherein the operating member is connected to the rear frame through a sliding shaft, and the connecting part is driven to move the pulling member by moving the handle part along the sliding shaft, to pull the driving arm to withdraw into the gear.

* * * * *